(12) United States Patent
Lind

(10) Patent No.: US 12,040,712 B2
(45) Date of Patent: Jul. 16, 2024

(54) METHOD AND SYSTEM FOR ENTERING AND EXITING A FREQUENCY CLAMP MODE FOR VARIABLE FREQUENCY, OFFLINE SWITCH-MODE POWER CONVERTERS

(71) Applicant: SEMICONDUCTOR COMPONENTS INDUSTRIES, LLC, Scottsdale, AZ (US)

(72) Inventor: Anders Lind, San Juan Capistrano, CA (US)

(73) Assignee: SEMICONDUCTOR COMPONENTS INDUSTRIES, LLC, Scottsdale, AZ (US)

(*) Notice: Subject to any disclaimer, the term of this patent is extended or adjusted under 35 U.S.C. 154(b) by 158 days.

(21) Appl. No.: 17/524,067

(22) Filed: Nov. 11, 2021

(65) Prior Publication Data

US 2022/0158559 A1    May 19, 2022

Related U.S. Application Data

(60) Provisional application No. 63/114,090, filed on Nov. 16, 2020.

(51) Int. Cl.
*H02M 1/42*    (2007.01)
*H02M 3/158*   (2006.01)

(52) U.S. Cl.
CPC ....... *H02M 3/1582* (2013.01); *H02M 1/4208* (2013.01)

(58) Field of Classification Search
CPC .......... H02M 3/02; H02M 3/04; H02M 3/156; H02M 3/158; H02M 3/1582; H02M 3/1566; H02M 3/1588; H02M 1/0016; H02M 1/0019; H02M 1/0022; H02M 1/0032; H02M 1/0035; H02M 1/0048; H02M 1/0054; H02M 1/0058; H02M 1/088; H02M 1/32; H02M 1/42; H02M 1/4208; H02M 1/4216; H02M 1/4225; H02M 1/4233;
(Continued)

(56) References Cited

U.S. PATENT DOCUMENTS 7,598,715 B1   10/2009   Hariman et al.
7,706,151 B2   4/2010    Neidorff et al.
(Continued)

OTHER PUBLICATIONS

U.S. Appl. No. 17/524,117, "Notice of Allowance", May 12, 2023, 11 pages.
(Continued)

*Primary Examiner* — Thienvu V Tran
*Assistant Examiner* — Carlos O Rivera-Perez
(74) *Attorney, Agent, or Firm* — KW Law, LLP

(57) ABSTRACT

A controller for controlling a switching power converter having an input for receiving a periodic input signal and an output for providing a substantially constant output voltage to a load includes a monitor device configured to compare a switching time interval or a switching frequency with a predetermined threshold value to obtain a comparison result and a parameter recorder configured to record an entry criteria in response to the comparison result, wherein the entry criteria indicates a transition of the switching power converter from a variable switching frequency state to a constant switching frequency state.

17 Claims, 10 Drawing Sheets

(58) Field of Classification Search
CPC .... H02M 1/4241; H02M 1/4258; H02M 7/02; H02M 7/04; H02M 7/12; H02M 7/162; H02M 7/21; H02M 7/217; H02M 7/219; H02M 7/2195; Y02B 70/10
USPC ........ 323/205–211, 235, 259, 266, 271–275, 323/282–286, 299–303, 319, 351; 363/16, 17, 21.02, 21.03, 44–48, 56.12, 363/79, 81, 84, 106, 108, 123–127
See application file for complete search history.

(56) References Cited

U.S. PATENT DOCUMENTS

| | | | |
|---|---|---|---|
| 8,077,490 | B1 | 12/2011 | Prodic et al. |
| 8,493,049 | B2 | 7/2013 | Kwan et al. |
| 8,670,255 | B2 | 3/2014 | Gong et al. |
| 8,934,273 | B2 | 1/2015 | Chalermboon et al. |
| 10,439,508 | B2 | 10/2019 | Adragna |
| 10,720,829 | B1 | 7/2020 | Huang et al. |
| 2011/0317459 | A1* | 12/2011 | Kuebrich ............ H02M 1/4225 363/126 |
| 2016/0190912 | A1 | 6/2016 | Lim et al. |
| 2016/0241132 | A1 | 8/2016 | Lin et al. |
| 2019/0319528 | A1 | 10/2019 | Matsuura et al. |
| 2020/0112243 | A1 | 4/2020 | Dusmez |
| 2021/0305907 | A1* | 9/2021 | Dong .................... H02M 1/083 |

OTHER PUBLICATIONS

U.S. Appl. No. 17/524,064, "Non-Final Office Action", Jun. 14, 2023, 9 pages.
U.S. Appl. No. 17/524,136, "Notice of Allowance", Jun. 22, 2023, 11 pages.

* cited by examiner

METHOD AND SYSTEM FOR ENTERING AND EXITING A FREQUENCY CLAMP MODE FOR VARIABLE FREQUENCY, OFFLINE SWITCH-MODE POWER CONVERTERS

CROSS-REFERENCES TO RELATED APPLICATIONS

This application claims the benefit of U.S. Provisional Application No. 63/114,090, filed on Nov. 16, 2020, the contents of which are hereby incorporated by reference in their entirety for all purposes.

The following regular U.S. patent applications (including this one) are being filed concurrently, and the entire disclosure of the other applications is incorporated by reference into this application for all purposes:

application Ser. No. 17/524,030, entitled "Nonlinear, Discrete Time Control of Power Factor Correction Power Converter";

application Ser. No. 17/524,064, entitled "Method and System for Controlling the Power Factor of a Power Converter";

application Ser. No. 17/524,067, entitled "Method and System for Entering and Exiting a Frequency Clamp Mode for Variable Frequency, Offline Switch-Mode Power Converters,"

application Ser. No. 17/524,117, entitled "Method and Apparatus for Digital, Closed-Loop Control of CRCM Switch-Mode Power Converters,"

application Ser. No. 17/524,126, entitled "Method and Apparatus for Over-Current Protection and CrCM Control in Power Converters," and application Ser. No. 17/524,136, entitled "Method and Apparatus for Sensing the Input Voltage of a Power Converter."

BACKGROUND OF THE INVENTION

A boost power converter operates in a Critical Conduction Mode (CrCM) by charging an inductor from 0 A to a peak current via an input source voltage, and then discharging the inductor into an output capacitor. The peak inductor current is regulated such that an average input power is approximately equal to an average output power. In order to provide a large output power, a large peak inductor current has to flow through the inductor into the output capacitor.

Despite the progress made in the area of boost power converters, there is a need in the art for improvements in the area of boost power converters, e.g., to reduce switching losses at light load.

SUMMARY OF THE INVENTION

The present invention generally relates to semiconductor circuits and methods of operating a power converter, and more particularly to a system, apparatus and method of controlling power converters to utilize a limiting, maximum switching frequency.

Embodiments of the present invention can utilize discrete time control of the on-time of the power converter in conjunction with a frequency clamp mode utilizing the symmetry of the input signal to define entry and exit criteria for the frequency clamp mode.

According to an embodiment of the present invention, a controller for controlling a switching power converter having an input for receiving a periodic input signal and an output for providing a substantially constant output voltage to a load is provided. The controller includes a monitor device configured to compare a switching time interval or a switching frequency with a predetermined threshold value to obtain a comparison result and a parameter recorder configured to record an entry criteria in response to the comparison result. The entry criteria indicates a transition of the switching power converter from a variable switching frequency state to a constant switching frequency state. The constant switching frequency state can include a constant switching frequency that is lower than a switching frequency of the variable switching frequency state. The constant switching frequency state can be a discontinuous conduction mode and the variable switching frequency state can be a critical conduction mode. The periodic input signal can include a rectified sinusoid waveform.

According to another embodiment of the present invention, a method of operating a switching power converter having an input for receiving a periodic input signal and an output for providing a substantially constant output voltage is provided. The method includes measuring a switching time interval or a switching frequency of the switching power converter by a monitor device and comparing the switching time interval or a switching frequency with a predetermined threshold value to obtain a comparison result. The method also includes recording an entry criteria in response to the comparison result. The entry criteria indicates a transition of the switching power converter from a variable switching frequency state to a constant switching frequency state.

According to a specific embodiment of the present invention, a method of operating a switching power converter configured to receive a periodic varying input signal is provided. The method includes (a) measuring a switching frequency of the switching power converter, (b) determining that the switching frequency reaches a threshold value, and (c) recording a metric associated with the switching power converter. The method also includes (d) defining exit criteria based on the metric and symmetric properties of the periodic varying input signal, (e) entering a frequency clamped mode, (f) determining that the exit criteria are met, and (g) exiting the frequency clamped mode based on determining that the exit criteria are met.

In an embodiment, the method further includes after exiting the frequency clamped mode in step (g), repeating steps (a) through (g) for a next cycle of the periodic varying input signal. The switching power converter can operate in a critical conduction mode before entering the frequency clamped mode. The method can also include returning to the critical conduction mode after exiting the frequency clamped mode. The switching frequency of the switching power converter can be a variable frequency having a lowest frequency at a peak magnitude of the periodic varying input signal, and the frequency clamped mode can have a frequency lower than the lowest frequency of the variable frequency.

According to another specific embodiment of the present invention, a controller for controlling a switching power converter configured to receive a periodic varying input signal is provided. The controller is configured to measure a switching frequency of the switching power converter and determine that the measured switching frequency reaches a threshold value. The controller is further configured to record a metric associated with the switching power converter, define exit criteria based on the metric and symmetric properties of the periodic varying input signal, and enter a frequency clamped mode. The controller is also configured to determine that the exit criteria are met and exit the frequency clamped mode based on determining that the exit criteria are met.

In some embodiments, the controller is further configured to, after exiting the frequency clamped mode, repeat steps including measuring the switching frequency through exiting the frequency clamped mode for a next cycle of the periodic varying input signal. The switching power converter can be configured to operate in a critical conduction mode before entering the frequency clamped mode. The controller can be further configured to return to the critical conduction mode after exiting the frequency clamped mode. The switching frequency of the switching power converter can be a variable frequency having a lowest frequency at a peak magnitude of the periodic varying input signal, and the frequency clamped mode has a frequency lower than the lowest frequency of the variable frequency.

Numerous benefits are achieved by way of the present disclosure over conventional techniques. For example, embodiments of the present disclosure can provide improved energy efficiency with a low switching frequency when a converter operates in a frequency clamped mode of operation. In one embodiment, the normal operation mode is a critical conduction mode. In particular, embodiments allow for optimization options between switching losses and conduction losses according to operating conditions, e.g., input voltages and output powers. These and other embodiments of the disclosure, along with many of its advantages and features, are described in more detail in conjunction with the text below and corresponding figures.

DETAILED DESCRIPTION OF SPECIFIC EMBODIMENTS

Embodiments of the present disclosure provide novel technical solutions to optimize the reaction of the power converter when the "natural" switching frequency of a critical conduction mode (CrCM) converter exceeds a predetermined switching frequency threshold. Embodiments also overcome limitations and disadvantages associated with conventional systems.

The time to charge an inductor to a target peak current is a function of the input voltage, the inductance value of the inductor, and the target peak current. Therefore, it takes longer to get to the peak current when the output power is higher. Similarly, the time to discharge the inductor back to 0 A is a function of the input voltage, the output voltage, the inductance, and the peak current. Therefore, it takes longer to discharge the inductor when the output power is higher. The switching period is substantially proportional to the inductor charging time and discharging time, which, in turn, depends on the output power. Thus, for a CrCM boost converter, the switching frequency is higher at a lower output power and lower at a larger output power. As a result, the transferred power is not efficient.

Figure 1:
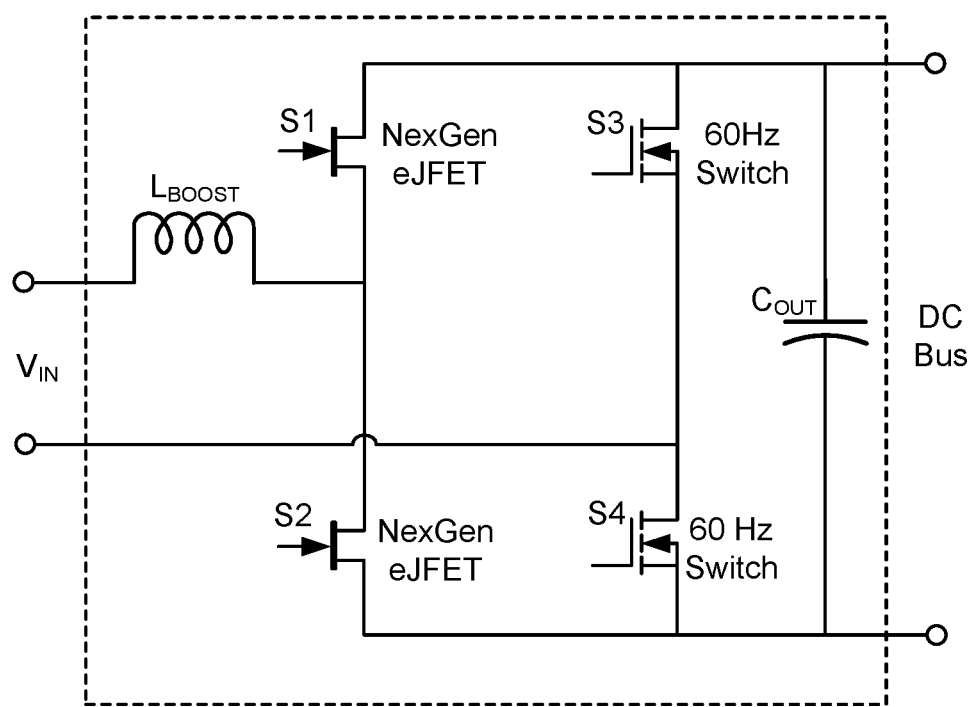
FIG. 1 is a simplified schematic diagram of a bridgeless totem-pole power factor converter operated in the critical conduction mode that can be utilized for explaining embodiments of the present disclosure.

FIG. 1 is a simplified schematic diagram of a bridgeless totem-pole power factor converter 100 operated in the critical conduction mode that can be utilized for explaining embodiments of the present disclosure. Converter 100 receives a cyclically varying input voltage $V_{IN}$ (e.g., an alternating current (AC) power supply from an electrical outlet or wall socket), and includes a boost inductor $L_{BOOST}$, a first switch S1, a second switch S2, a third switch S3, a fourth switch S4, and a capacitor $C_{OUT}$. In one embodiment, each of first switch S1 and second switch S2 is an enhanced mode junction field effect transistor (eJFET), such as the eJFET NXG2EA070R170 available from NexGen Power Systems, Inc. In a positive AC half-cycle of the cyclically varying input voltage $V_{IN}$, switch S4 is turned on and switch S3 is turned off for the entire positive AC half-cycle.

Figure 2A:
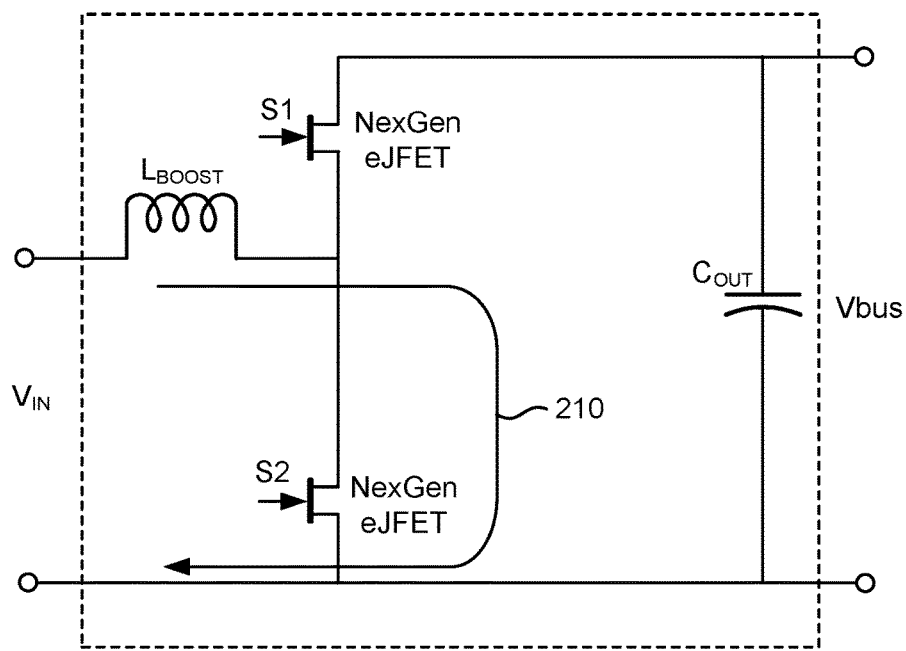
FIG. 2A is a simplified block circuit diagram illustrating an operation of a bridgeless totem-pole power factor converter when the input voltage polarity is positive for explaining embodiments of the present disclosure.

FIG. 2A is a block circuit diagram illustrating the operation of converter 200 in a positive AC half-cycle of the input signal $V_{IN}$, where switch S3 is turned off and switch S4 is turned on for the entire positive AC half-cycle. Switch S2 is turned on for a constant on-time interval, which is alternatively referred to as "on-time." The current path through the inductor is shown as an arrow 21 when switch S2 is turned on. During the time in which switch S2 is turned on, the current in the boost inductor $L_{BOOST}$ increases at a linear rate equal to $T_{ON}*V_{IN}/L$, where $T_{ON}$ is the constant on-time of switch S2, $V_{IN}$ is the input voltage, and L is the inductive value of the boost inductor $L_{BOOST}$. During switch S2 on-time, switch S1 is turned off, and charge stored in the output capacitor $C_{OUT}$ supplies current to a load (not shown) connected across the output capacitor $C_{OUT}$. When switch S2 is turned off, switch S1 is turned on, the energy stored in the boost inductor $L_{BOOST}$ is delivered to the output and the boost inductor current decreases toward zero at a rate equal to $(V_{BUS}-V_{IN})/L$. When the current flowing through the boost inductor $L_{BOOST}$ reaches zero, switch S2 is turned on again, switch S1 is turned off, and the process repeats.

Figure 2B:
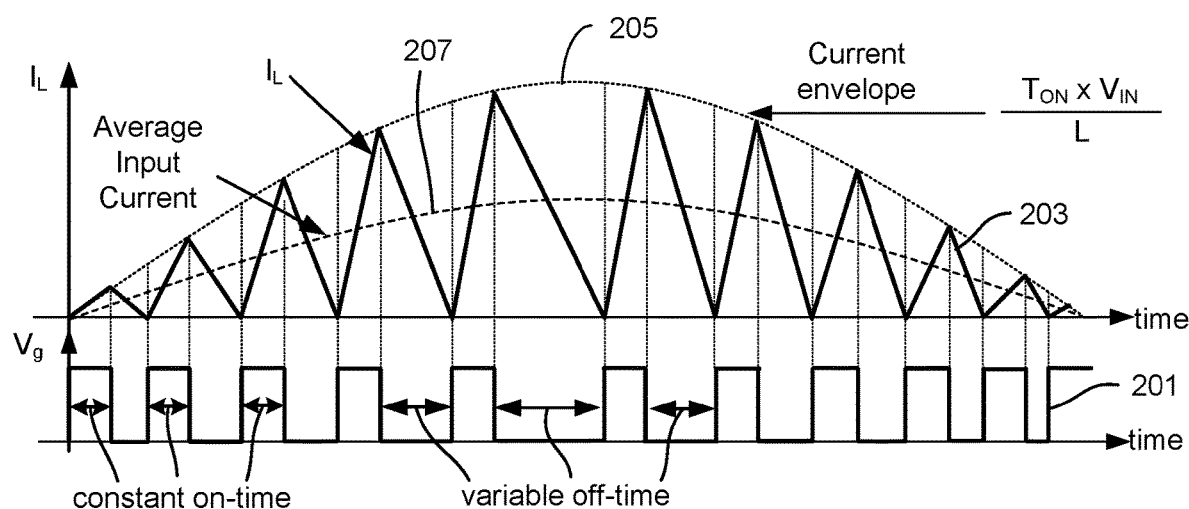
FIG. 2B is a graph illustrating a low switching frequency operation of a power converter circuit with a constant on-time control that can be utilized for explaining embodiments of the present disclosure.

FIG. 2B is a graph illustrating a low switching frequency operation of a power converter circuit with a constant on-time control that can be utilized for explaining embodiments of the present disclosure. Referring to FIG. 2B, curve 201 denotes constant on-time control signals having variable off-time intervals, which are configured to turn on and turn off switch S2. Curve 203 denotes an inductor current flowing through the boost inductor $L_{BOOST}$. Curve 205 (dotted line) denotes a current envelope during an AC half-cycle. Curve 207 (dashed line) denotes an average input current. As shown in FIG. 2B, the inductor current (curve 203) is a function of the input signal and has a small peak amplitude value in the vicinity of the zero-crossing point of the input signal. When switch S2 is turned off after the on-time interval expires, the energy stored in the inductor is discharged, i.e., the inductor current is sloped down back to zero. Switch S2 is then turned on again, with the inductor current reaching a higher peak amplitude value, so that the time utilized for the inductor current to go back to zero is longer because it starts from a higher peak amplitude value. Each of the on-time control signals has a time period $(T_{ON}+T_{OFF})$, where $T_{ON}$ is the constant on-time interval and $T_{OFF}$ is the variable off-time interval. The periods of the on-time control signals increase as the input signal $V_{IN}$ increases due to the fact that the inductor current decreases at the rate equal to $(V_{BUS}-V_{IN})/L$, where $V_{BUS}$ and L are constant and $V_{IN}$ increases. In other words, the switching frequency, which is equal to $1/(T_{ON}+T_{OFF})$, has a minimum frequency value at the center point of the input signal (i.e., at the peak amplitude) and a maximum frequency value at both ends of the input signal (i.e., in the vicinity of the zero-crossing points).

The time it takes to charge the inductor to the target peak current is a function of the input voltage, which can be assumed to be constant; the inductance value, which can also be assumed to be constant; and target peak current. Therefore, it takes longer to get to the peak current when the output power is higher. The time it takes to discharge the inductor back to 0 A is a function of the input voltage, which can be assumed to be constant; the output voltage, which can be assumed to be constant; the inductance, which can be assumed to be constant; and the peak current. Therefore, it takes longer to discharge the inductor when the output power is higher.

Ignoring a dead time, which should be a small percentage of the overall switching period, the switching period is substantially made up of the inductor charging time and the inductor discharging time.

It follows that the switching frequency depends on and changes with the output power. A switching frequency is thus higher at a lower output power and lower at a larger output power for a CrCM boost converter.

If the CrCM boost converter operates as an offline Power Factor Correcting (PFC) converter, then the input voltage is AC and the on-time (i.e., the inductor charging time) is controlled to be substantially constant across the AC cycle.

Thus, the switching frequency of such an offline PFC boost CrCM converter depends only on the demagnetization time. Since the peak current changes as a function of the input voltage, the lowest peak current occurs near the AC zero-crossing. The demagnetization time is a function of the difference between the output voltage and input voltage, and the difference is greatest near the AC zero crossing.

The switching frequency of an offline CrCM boost PFC converter is thus highly variable vs. output power and input voltage (during an AC cycle), and is highest when the output power is low and the input voltage is near the AC zero crossing.

Figure 3:
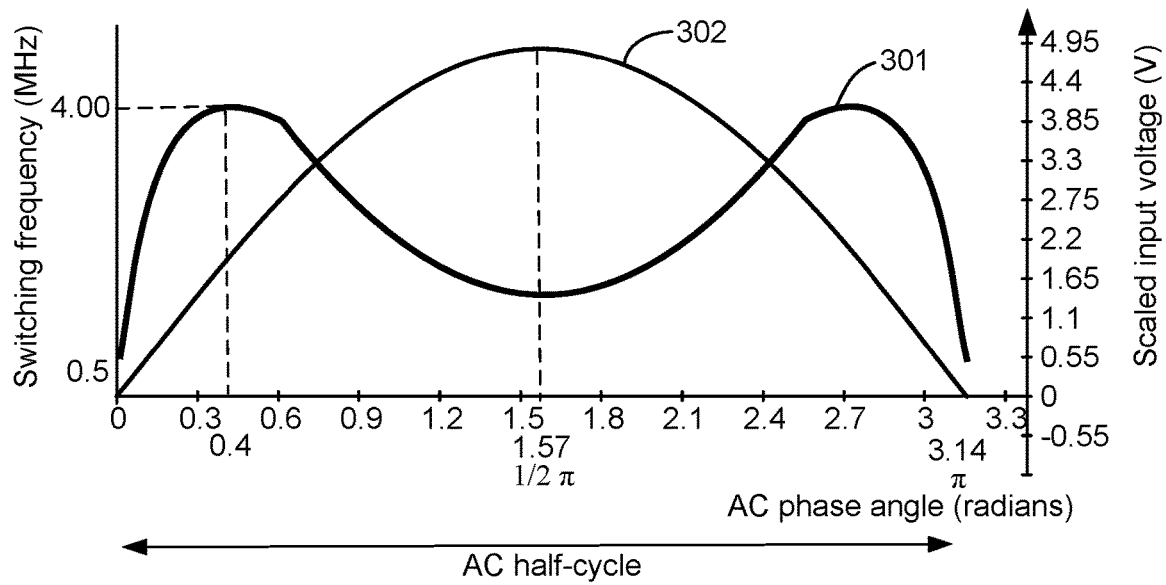
FIG. 3 is a graph illustrating a switching frequency in relation to an AC half-cycle of the cyclically varying input signal that can be utilized for explaining embodiments of the present disclosure.

FIG. 3 is a graph illustrating a switching frequency in relation to an AC half-cycle of the cyclically varying (AC) input signal that can be utilized for explaining embodiments of the present disclosure. Referring to FIG. 3, the abscissa (i.e., the horizontal x-axis) represents an AC phase angle over a half-cycle (0 to π radians), and the ordinate (i.e., the vertical y-axis) represents the switching frequency in MHz or a scaled version of an AC input signal in volts. Curve 301 corresponds to an example switching frequency vs. an AC input phase angle for the CrCM totem-pole boost power factor correcting, switched-mode power converter with zero-crossing distortion correction, input current shaping, and triangular current mode control for a zero-voltage switching extension. Curve 302 is an example scaled version of the input voltage, which is scaled for presentation on the same plot as curve 301.

Referring to FIG. 3, a consequence of using a constant on-time in the CrCM is that the switching frequency can be seen to vary over the AC cycle from a minimum of a few hundred kHz (500 kHz or 0.5 MHz) at 0 radians to a maximum of approximately 4 MHz at around 0.4 radians. Thus, the switching frequency changes by a factor of ~10 in the first portion of the AC half cycle. The power losses in a system like the CrCM boost converter can be split into two categories: the portion that depends on the switching frequency ("switching losses"), and the $I^2R$ losses that are fairly independent of switching frequency ("conduction losses").

Referring back to FIG. 2B, the control voltage Vs is characterized by constant on-time and variable off-time. As illustrated in FIG. 2B, the variation in the off-time results in the variable switching frequency illustrated in FIG. 3.

It is typically an optimization target to minimize power losses in power conversion systems at any operating condition, including, and specifically, at very light load conditions. Since the conduction losses are mainly a function of load, they comprise a fairly low portion of the overall power losses at light load, where the overall power losses are thus fairly dominated by switching losses. The fact that switching losses increase with lighter load is then directly at odds with loss optimization. During CrCM operation, the switch on-time is held constant during the line cycle and the switch is turned on when the inductor current falls to zero, so that the converter operates at the boundary between the continuous conduction mode (CCM) and discontinuous conduction mode (DCM).

In addition to switching power losses, there are other challenges associated with power converter control systems characterized by a large possible variation of the switching frequency over the operational envelope. Combined, these factors create a motivation for deviating from the classic CrCM operations for conditions in which the "natural" switching frequency exceeds a certain programmed or predetermined threshold.

The CrCM control technique has the disadvantage of variable switching frequencies that can have a wide frequency range (e.g., from 500 kHz to 4 MHz as illustrated in FIG. 3) and the inductor voltage is sensed in order to detect the zeroing of the inductor current.

In some techniques, a high switching frequency is clamped to a fixed value that coincides with an actual threshold, where the converter then deviates from the CrCM and instead operates in a fixed frequency DCM, where the control switch is not turned on immediately after the inductor current reaches 0 A after discharge, but rather after a time period after the inductor current has reached 0 A.

Figure 4:
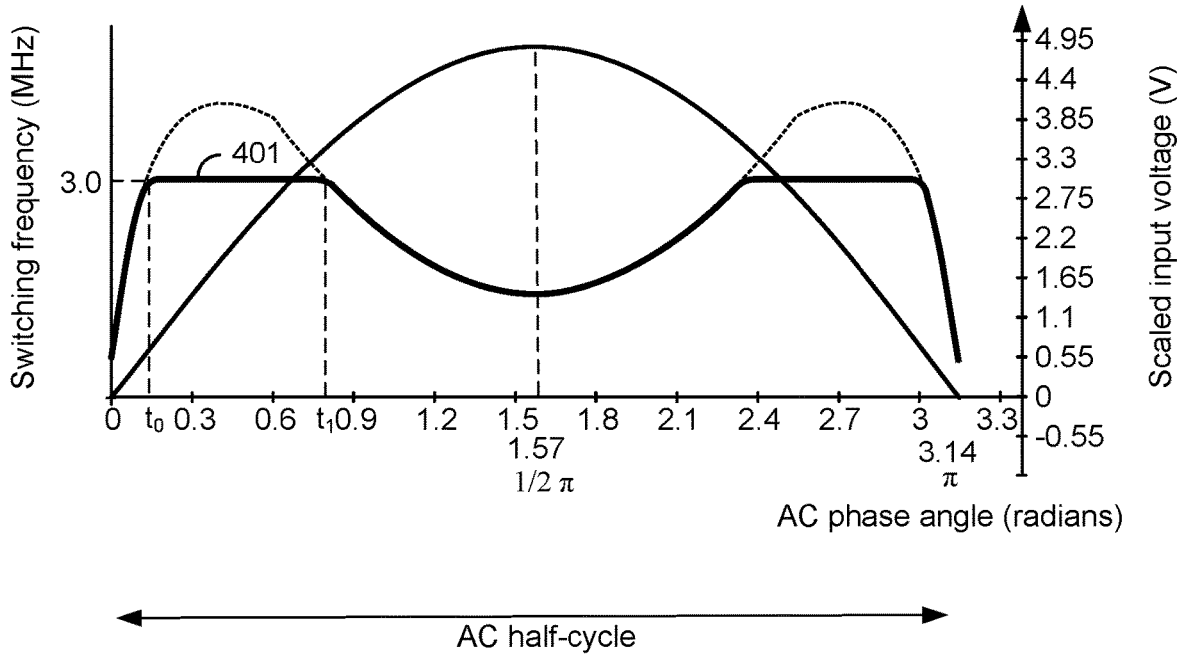
FIG. 4 is a graph illustrating a clamped switching frequency in relation to an AC half-cycle of the cyclically varying input signal that can be utilized for explaining embodiments of the present disclosure.

FIG. 4 is a graph illustrating a clamped switching frequency in relation to an AC half-cycle of the cyclically varying input signal that can be utilized for explaining embodiments of the present disclosure. Referring to FIG. 4, the abscissa (i.e., the horizontal x-axis) represents an AC phase angle over a half-cycle (0 to 71 radians), and the ordinate (i.e., the vertical y-axis) represents the switching frequency in MHz or a scaled version of an AC input signal in volts. Curve 401 is an example switching frequency, which is capped or clamped to a predetermined maximum frequency (e.g., 3 MHz) to limit the maximum switching frequency, so that the ratio between the maximum switching frequency and the minimum switching frequency can be reduced.

However, the CrCM operating mode is no longer implemented when the maximum switching frequency is clamped. As described above, the CrCM operating mode has a significant advantage in that a natural voltage commutation occurs between the time the inductor is fully discharged, and the voltage across the control switch is the full output voltage, and the time the control switch is turned on, at which time it has 0 V across it. This natural voltage commutation is instrumental in minimizing switching losses. When changing from the CrCM (e.g., variable frequency in the concave portion of curve 401 prior to time to) into the DCM (e.g., fixed frequency in the flat portion of curve 401 between time to and ti), the natural commutation is no longer synchronized with the turn-on instance of the control switch, and the soft-switching is compromised or lost. Since the purpose of the frequency clamping, at least in part, is to minimize switching losses, it seems counterintuitive to employ a technique that increases switching losses exactly at the highest switching frequency.

Figure 5:
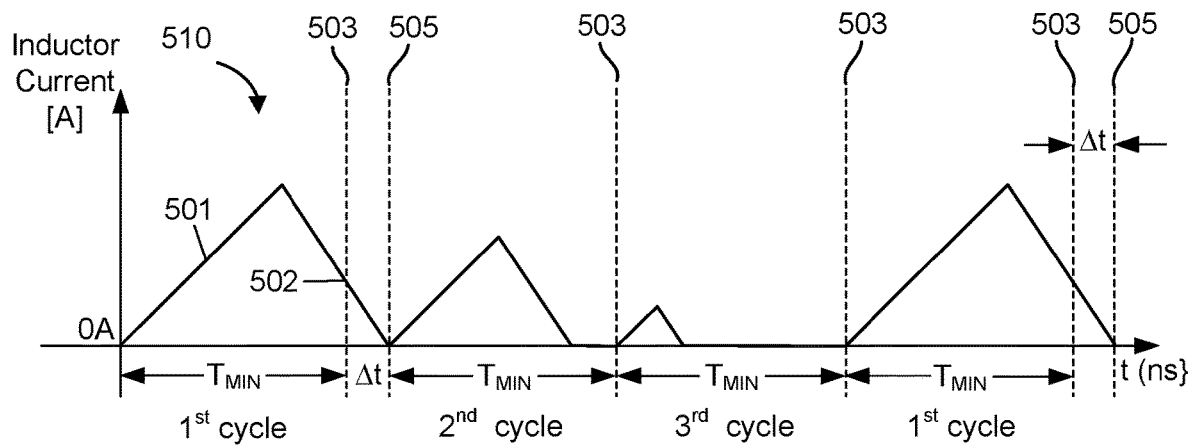
FIG. 5 is a graph illustrating an example of an inductor current during a cycle-by-cycle frequency clamping that can be utilized for explaining embodiments of the present disclosure.

FIG. 5 is a graph illustrating an example of an inductor current during a cycle-by-cycle frequency clamping that can be utilized with reference to FIG. 2B and FIG. 4 for explaining embodiments of the present disclosure. Referring to FIG. 5, the abscissa (i.e., the horizontal x-axis) represents the time in nanoseconds and the ordinate (i.e., the vertical y-axis) represents the inductor current in amps. In the example shown, four cycles are used that have a minimum time interval $T_{MIN}$, which corresponds to the clamped switching frequency during the flat portion of curve 401 in FIG. 4. The dimensions of the pulse widths and current peaks are exaggerated relative to each other for illustrating the concept and do not necessarily represent an actual operation (e.g., adjacent cycles would bear much closer resemblance to one another).

The first pulse 510 results in a switching period that is sufficiently long such that the minimum time interval $T_{MIN}$ has expired before the inductor is completely demagnetized. The inductor current 501 reaches its peak at the end of the on-time interval and begins to slope down toward 0 A. Vertical line 503 in the first cycle denotes the time where the minimum time interval $T_{MIN}$ has expired, but the control switch is not turned on because the inductor is not yet completely demagnetized. The time between vertical line 503 and vertical line 505 denotes the additional time internal $\Delta t$ required for the inductor current to go to 0 A. Thus, during additional time interval $\Delta t$, the remaining current amount 502 present at the time corresponding to vertical line 503 decreases to zero at the time corresponding to vertical line 505. The inductor current can reach 0 A at or after the additional time interval $\Delta t$, and the timer can turn on the control switch at this time. For this case of soft switching, turning on the control switch at exactly the time when the inductor current is 0 A will reduce power dissipation in the converter. During the second cycle, the inductor current increases and then decreases to 0 A before the minimum time interval $T_{MIN}$ expires. During the third cycle, the inductor current increases and then decreases to 0 A at a time that is a considerable time before the minimum time interval $T_{MIN}$ expires. As a result, during the third cycle, there is an extended time period before the control switch is turned on. In the second and third cycles, the control switch is not turned on at the exact time when the voltage of the input signal is at zero and this hard switching causes higher conduction power losses, in particular at high, fixed switching frequencies.

A "valley switching" technique can also be utilized to achieve a softer switching event and minimize switching losses. The valley switching technique senses the voltage of the control switch (e.g., the drain voltage of the eJFET or switch S2) and switches when the voltage is minimal (i.e., if not 0) instead of asynchronously switching with the inductor discharge.

Figure 6A:
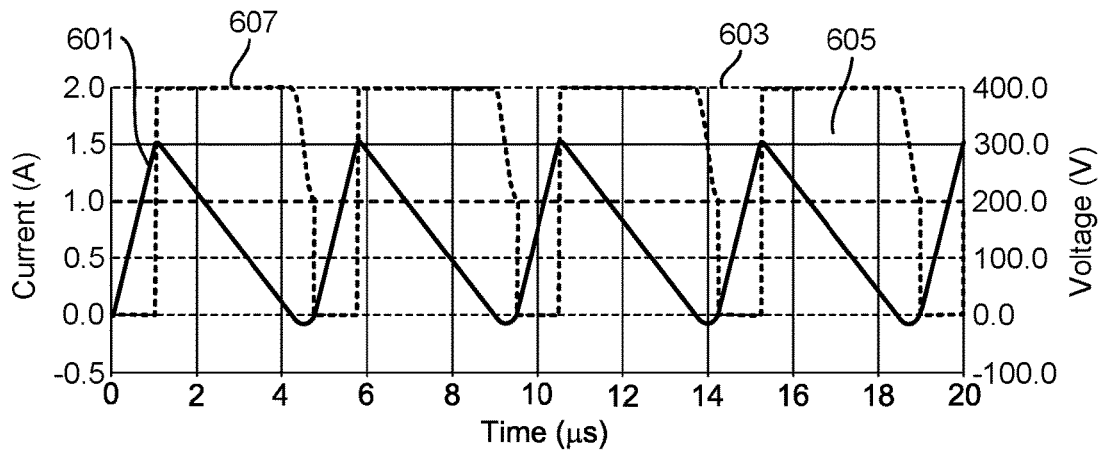
FIG. 6A illustrates a first valley switching technique according to an embodiment of the present disclosure.
Figure 6B:
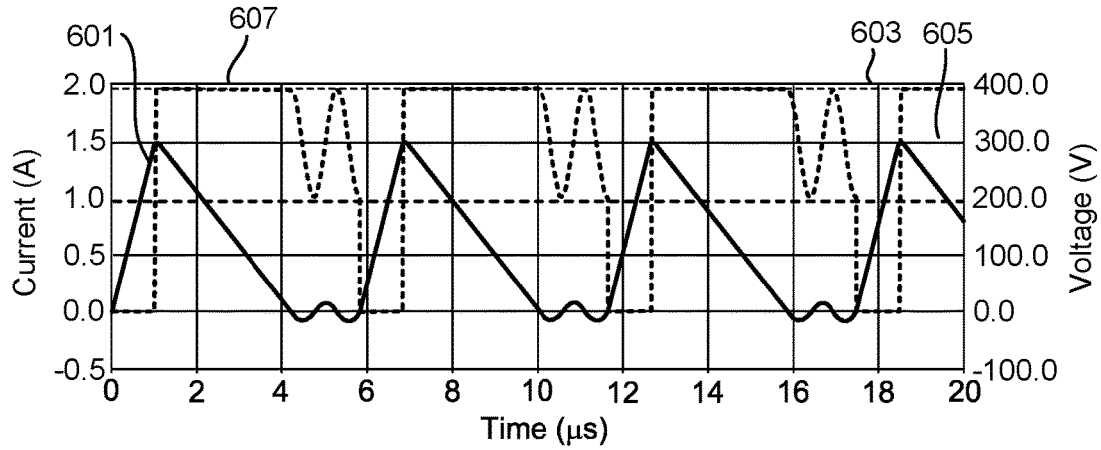
FIG. 6B illustrates a second valley switching technique according to an embodiment of the present disclosure.

FIG. 6A illustrates a first valley switching technique according to an embodiment of the present disclosure. FIG. 6B illustrates a second valley switching technique according to an embodiment of the present disclosure.

Referring to FIGS. 6A and 6B, the abscissa (i.e., the horizontal x-axis) represents the time in microseconds, the ordinate (i.e., the vertical y-axis) at the left side represents the inductive current in amps, and the vertical axis at the right side represents input and output voltages in volts. Curve 601 represents the current flowing through the inductor. Curve 603 represents the output voltage $V_{BUS}$, which is 400 V in the example shown. Curve 605 represents the input voltage $V_{IN}$, which is 300 V in the example shown. Curve 607 represents the drain voltage of the control switch S2 that is illustrated in FIG. 2A.

FIG. 6A illustrates an example of a first valley switching technique in which the control switch is turned on when the drain voltage rings to its minimum for the first time according to an embodiment of the present disclosure. Although FIG. 6B illustrates an example of a second valley switching according to an embodiment of the present disclosure, it will be appreciated that the example shown in FIG. 6B applies as well to the more general case of the $N^{th}$ valley switching technique. In the examples shown, instead of asynchronous switching at any time, the controller seeks to switch exactly at the valley (first, second, $N^{th}$) to minimize switching losses, while lowering the switching frequency.

By selecting the most opportune time (e.g., near a target) to turn on the control switch, the transition occurs when the voltage across the control switch is at its lowest value, or a reasonable value, in the $N^{th}$ valley after demagnetization is completed. Thus, this technique at least ensures that the ½%*C*V² energy stored in parasitic capacitances is partially removed (i.e., 'resonantly') before a hard-switching event dissipates the remainder of the parasitic capacitances in the device conduction channel (i.e., 'resistively').

Disadvantages of these valley switching techniques include the complexity of sensing and/or timing the transition correctly, and the fact that the switching frequency still remains approximately at the highest level.

Conventional frequency clamping techniques employ a timer or something equivalent to ensure a minimum switching period duration. Referring back to FIG. 5, each cycle is simply extended individually, such that the turn-on of the control switch occurs only when both the following two criteria are satisfied:
1. The inductor current has reached zero (i.e., the demagnetization of the inductor is complete); and
2. The minimum time interval $T_{MIN}$ of a minimum interval timer has expired since the last turn-on of the control switch.

These cycle-by-cycle frequency clamping techniques can then be further enhanced, for example, with the valley-switching techniques, which involve skipping a number of "valleys" in order to turn on the control switch upon the occurrence of the last valley, for instance, skip the first valley, the second valley, etc. until the last $N^{th}$ valley.

Embodiments of the present disclosure provide novel technical solutions that significantly improve upon conventional frequency clamping techniques. Embodiments of the present disclosure rely on entry and exit criteria for an operation mode, also referred to as an operation state, which, when entered, may comprise multiple cycles. Accordingly, embodiments of the present disclosure employ a minimum interval timer for generating a minimum time interval and compare the minimum time interval with a pulse width during the normal "organic" operation. When the minimum time interval does not expire for a given pulse width, a counter is incremented, but the pulse width is not extended, so as to preserve the soft-commutation with its benefits to power dissipation and EMI.

When the counter exceeds a predetermined threshold, which can be 1 or more, then the frequency clamp mode is entered. At the time the frequency clamp mode is entered, an exit criteria is recorded. The exit criteria is based on parameters of an AC input signal, e.g., an input voltage level or an AC voltage phase angle. Thus, the fact that the operating frequency of an AC input signal (e.g., mains power, AC power grid) of an offline CrCM boost converter is substantially symmetrical is exploited to establish the exit criteria.

Figure 7A:
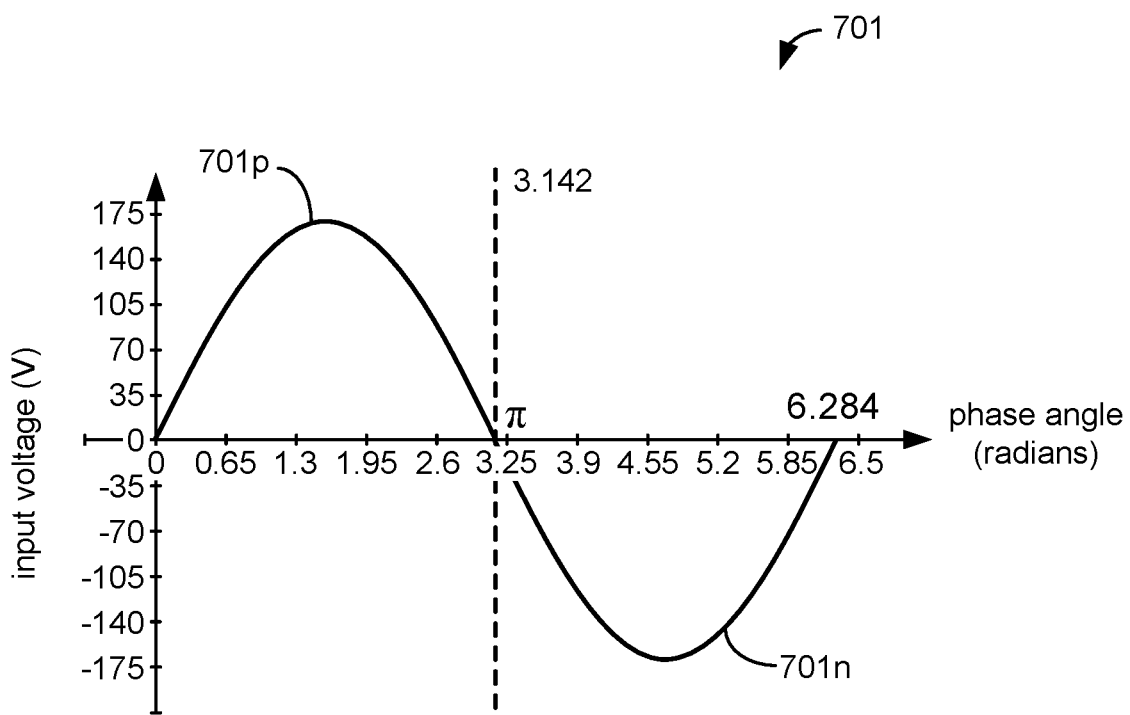
FIG. 7A is a graph illustrating a voltage of an AC input signal having a positive waveform and negative waveform of a complete cycle that is symmetrical around a zero-crossing that can be utilized for explaining embodiments of the present disclosure.

FIG. 7A is a graph illustrating a voltage waveform of an AC input signal 701 having a positive waveform 701p and a negative waveform 701n of a complete cycle that is symmetrical around a zero-crossing that can be utilized for explaining embodiments of the present disclosure. The ordinate (i.e., the vertical y-axis) represents the voltage amplitude in volts, and the abscissa (i.e., the horizontal x-axis) represents the phase angle in radians. The AC input signal may be an AC signal of a mains voltage and has a positive half-cycle extending from a phase angle of zero radians to π (~3.142) radians and a negative half-cycle extending from π (~3.142) radians to 2π (~6.284) radians.

Figure 7B:
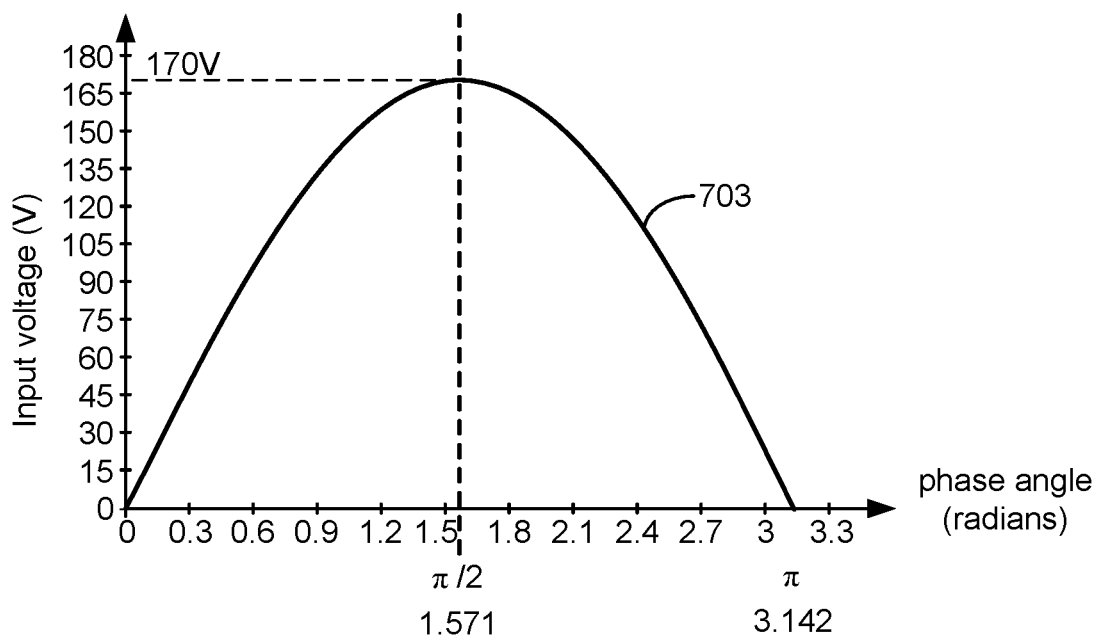
FIG. 7B is a graph illustrating a positive waveform of a half-cycle that is symmetrical around the peak amplitude of a half-cycle that can be utilized for explaining embodiments of the present disclosure.

FIG. 7B is a graph illustrating a positive waveform 703 of a half-cycle that is symmetrical around the peak amplitude of a half-cycle that can be utilized for explaining embodiments of the present disclosure. The ordinate (i.e., the vertical y-axis) represents the voltage amplitude in volts, and the abscissa (i.e., the horizontal x-axis) represents the phase angle in radians. Waveform 703 may represent the positive half-cycle 701p of FIG. 7A and has a voltage peak (170 V) at the phase angle of π/2 (~1.571) radians. Although only the positive half-cycle is shown, it is understood that the voltage peak may be used for the positive half-cycle or the negative half-cycle due to the nature of the symmetry.

An exit criteria can be set or determined by symmetry when the input voltage at which the frequency clamp mode was entered is recorded. Alternatively, as described herein, the AC phase angle could be recorded in place or in addition to the input voltage. The strategy of a change from an organic cycle-by-cycle clamping to a mode-selection with entry and exit criteria enables fundamental freedom to select an appropriate operating principle during frequency clamping. One such appropriate operating principle is to clamp the frequency at a substantially lower frequency than the maximum frequency of the threshold. An example of such frequency clamping strategy is discussed above with reference to FIG. 3 and FIG. 4.

An entry threshold can be recorded when operation of the converter causes X inductor current cycles, also referred to as switching periods, to be shorter in time duration than the predetermined threshold. Assuming symmetry, an exit threshold can then be recorded. As an example, for the frequency threshold of 3 MHz (illustrated in FIG. 4), a corresponding threshold time of 0.333 μs can be used. In one embodiment, a counter may be used to keep track of the number of inductor current cycles or switch periods having a time duration that is shorter than a minimum time interval (i.e., the switching frequency is greater than the maximum frequency represented by the frequency threshold). The number of inductor current cycles can be unity or greater than unity. In one embodiment, when the count in the counter is equal to unity or greater than unity, a frequency clamp flag is set to indicate an entry criteria for the frequency clamping operation. The entry parameters can be recorded or determined based on a phase angle, an amplitude, or time associated with the entry criteria. In one embodiment, the entry criteria is determined or recorded when the switching frequency reaches or exceeds a predetermined frequency value, for example, the frequency threshold. In one embodiment, exit parameters can then be determined from the entry parameters based on the symmetry properties of the input signal.

Figure 8:
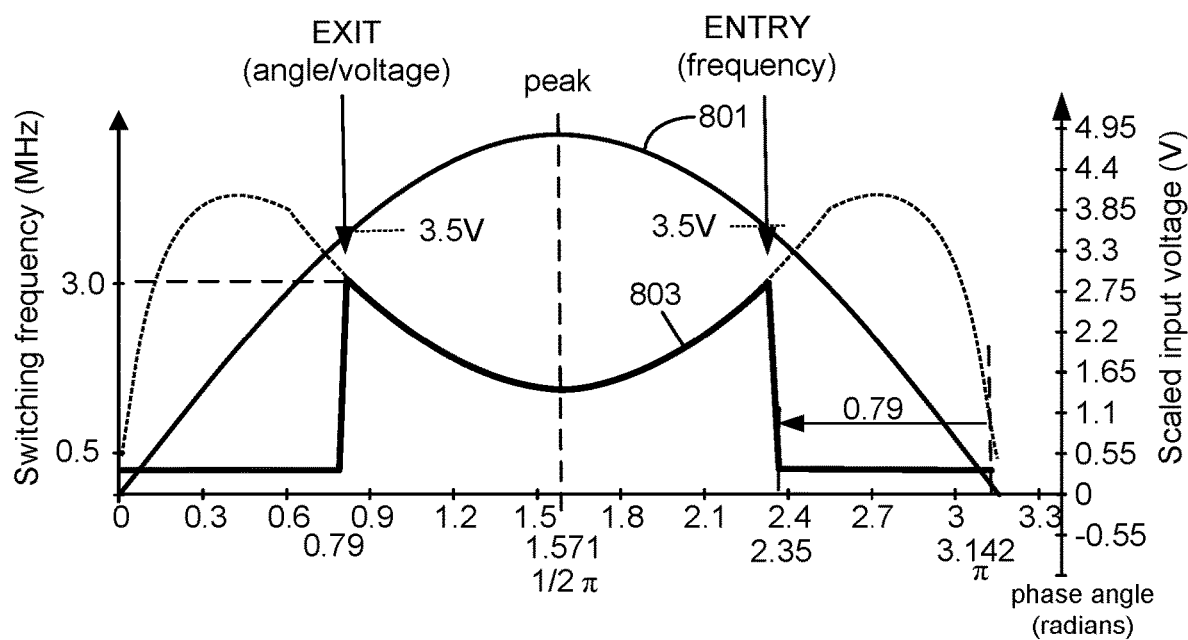
FIG. 8 is a graph illustrating a frequency clamp mode for a positive half-cycle according to an embodiment of the present disclosure.

FIG. 8 is a graph illustrating a frequency clamp mode for a positive half-cycle according to an embodiment of the present disclosure. The ordinate (i.e., the vertical y-axis) represents a scaled voltage amplitude in volts and a switching frequency in MHz, and the abscissa (i.e., the horizontal x-axis) represents the phase angle in radians. Curve 801 represents a scaled input voltage and curve 803 includes a concave portion between phase angle values of ~0.79 radians and 2.35 radians and representing the CrCM in which the control signal has a constant on-time and a variable off-time, and a constant (i.e., flat) minimum portion between phase angle values of 0 radians and ~0.79 radians and between phase angle values of ~2.35 radians and ~3.142 radians and representing the clamped switching frequency. As illustrated in FIG. 8, the inventor has determined that the switching frequency is symmetric around 0 radians and π/2. This symmetry can thus be utilized to improve the frequency clamping performance in comparison with conventional techniques.

In the case that the entry occurs on the negative dv/dt slope of the AC voltage, which may be a rectified AC voltage, as illustrated in FIG. 8, the exit criteria is set to either the symmetrical AC phase angle, the same AC input voltage level, or at a time twice the time period between the entry and the AC zero crossing. Referring to FIG. 8, in the case in which the exit criteria is set to the symmetrical AC phase angle, the symmetry can be about 0, π/2, or π and the exit criteria can differ in phase angle with respect to the entry criteria by (+π or +180°). In the example shown in FIG. 8, since the entry occurs at ~2.35 radians when the switching frequency reaches or exceeds a predetermined frequency value, the exit is set to ~0.79=2.35−π radians, which extends into the next AC half-cycle, resulting in a signal that is symmetric around π/2 radians.

Assuming that the switching frequency is to be clamped at 3 MHz and considering that the switching frequency indicated by curve 803 is increasing after π/2 radians, the switching frequency increases as indicated by curve 803 until a switching frequency of 3 MHz is reached. Given this frequency threshold of 3 MHz, the frequency clamp mode can be entered when the threshold is reached as indicated by the notation ENTRY positioned at ~2.35 radians. In order to determine the angle or voltage at which the frequency clamp mode should be exited, embodiments of the present disclosure utilize the symmetry of the switching frequency in the exit determination.

Since the ENTRY occurs ~0.79 radians prior to the AC zero crossing at π radians, utilizing symmetry around the AC zero crossing, the EXIT can be set to ~0.79 radians after the AC zero crossing. However, this may utilize knowledge of the AC frequency, which may not be available. Embodiments of the present invention achieve the same outcome by defining the EXIT to occur at the same absolute voltage level (e.g., a rectified AC voltage) as that of the ENTRY. This method is effective even in cases for which the AC frequency is not measured, sensed, or calculated. Referring to FIG. 8, the scaled voltage at ENTRY is measured as ~3.5 V. Accordingly, the EXIT is defined to occur when the voltage reaches this same voltage level after the zero-crossing as illustrated by the EXIT in FIG. 8. As illustrated in FIG. 8, the frequency clamp mode is entered at ~2.35 radians as the voltage is decreasing. The frequency clamp mode is maintained until the voltage once again reaches ~3.5 V, which corresponds to ~0.79 radians. Alternatively, the EXIT can be defined by assuming symmetry around π/2 (90 degrees) instead of π (180 degrees). In other embodiments, the time between entry and the AC zero crossing point is recorded and the exit criteria may be set to be the same time after the zero crossing point.

Thus, embodiments of the present invention may determine the exit criteria based on mirroring of the entry criteria with respect to a zero-crossing point of the periodic input signal or with respect to a peak voltage of the periodic input signal. As illustrated in FIG. 8, mirroring of the entry criteria around the zero-crossing point of the periodic input signal that occurs at π radians results in the exit criteria being set so that the frequency clamp mode is exited ~0.79 radians after the AC zero crossing. Alternatively, determining the exit criteria based on mirroring of the entry criteria with respect to the peak voltage of the periodic input signal could be used to set the exit criteria in a manner such that the frequency clamp mode is exited ~0.78 radians (i.e., ~2.35 radians−~1.571 radians=~0.78 radians) prior to the peak voltage in the next cycle of the periodic input voltage. One of ordinary skill in the art would recognize many variations, modifications, and alternatives.

Assuming that the AC input signal has a sinusoidal waveform or shape and the amplitude and frequency are known, the value of a voltage amplitude of an AC input signal $s(t)$ is a function of the frequency, phase, and time: $s(t)=A*\cos(\omega t+\varphi)$, where A is the amplitude, ω is the frequency, and y is the phase. Thus, when utilizing symmetry by assuming the sinusoidal shape of the waveform, the three parameters of voltage, phase angle, and time are complements to each other and any of them may be used to determine the exit criteria in accordance with the present disclosure.

During the positive dv/dt slope of the AC voltage, which may be a rectified AC voltage and occurs at phase angle values between 0 and π/2 radians, when a threshold frequency is exceeded and a minimum time interval has not expired, the exit criteria may still be set by symmetry. For example, the symmetry may be defined with respect to a phase angle of π/2 radians, a time equal to the time period between the peak voltage and entry, or a voltage equal to the voltage at the entry point on the negative dv/dt slope.

Figure 9:
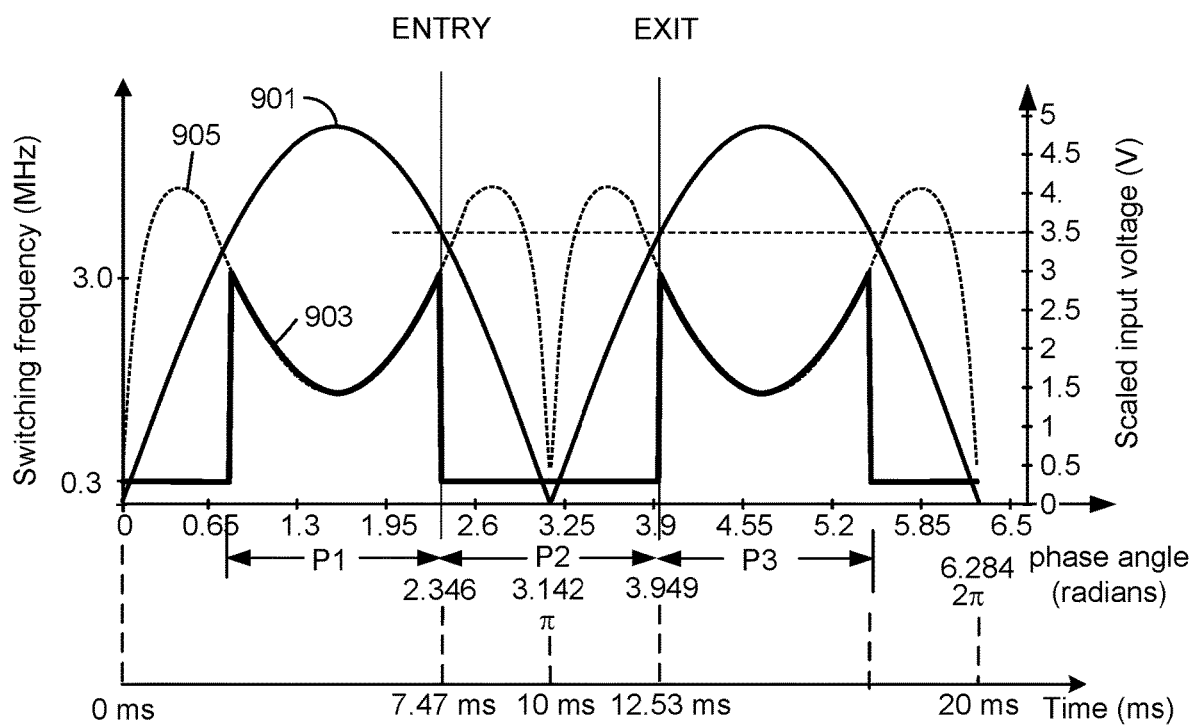
FIG. 9 is a graph illustrating a frequency clamp mode for a rectified cycle of an AC input signal having an entry frequency and an exit frequency as a function of an AC phase angle according to an embodiment of the present disclosure.

FIG. 9 is a graph illustrating a frequency clamp mode for a rectified cycle of an AC input signal having an entry frequency and an exit criteria as a function of an AC phase angle according to an embodiment of the present disclosure. The ordinate (i.e., the vertical y-axis) represents a scaled voltage amplitude in volts and a switching frequency in MHz, and the abscissa (i.e., the horizontal x-axis) represents the phase angle in radians. Curve 901 graphically represents a scaled input voltage, curve 903 has a concave portion representing the CrCM operation and a flat portion representing the clamped switching frequency on both sides of the concave portion, and curve 905 (dotted line) graphically represents the switching frequency of a CrCM operation without frequency clamping. The scaled input voltage can be obtained, e.g., from a resistive divider circuit from the AC input voltage (e.g., mains power, AC power grid, or the like).

In an exemplary embodiment, the switching frequency reaches the frequency threshold of 3 MHz at 2.346 radians (i.e., the end of time period P1). The voltage is measured using a voltage measurement circuit that records the scaled voltage at this ENTRY point to be 3.49 V, which can then be used as an exit criteria. The device will enter the frequency clamping mode as shown by ENTRY in FIG. 9 and will remain in the frequency clamping mode until the voltage once again reaches a scaled voltage of 3.49 V (i.e., during the time period P2). As the voltage increases after 10 ms, the voltage is monitored during time period P2 and the device exits the frequency clamping mode when the scaled voltage reaches 3.49 V and the device returns to the normal operating mode during time period P3. In one embodiment, the symmetric property of the scaled input voltage can be used to determine the entry phase angle and the exit phase angle, which are symmetrical with respect to the phase of π (~3.142) radians. It is noted that although radians are used to indicate the phase, it is understood that angular degrees can be used as well because a radian can be converted to degrees according to the equation: one radian=(180/π) degrees.

Different from the frequency clamping operation illustrated in FIG. 4, which shows a high clamped switching frequency, embodiments of the present disclosure provide a low clamped switching frequency that can be substantially lower, e.g., 10 times lower than the clamped switching frequency in FIG. 4 (i.e., 0.3 MHz vs. 3.0 MHz). This provides a significantly lower power loss. For example, assuming that the energy loss per switching cycle is 0.33 microJoule (µJ), the power loss is 1 W at a switching frequency of 3.0 MHz (i.e., 0.33 µJ×3 MHz=1 W). In contrast, the energy loss is 0.1 W (i.e., 10 times lower) when the switching frequency is 0.3 MHz (i.e., 0.33 µJ×0.3 MHz=0.1 W).

In one embodiment, the switching frequency can be selected according to the following operation conditions: (1) when the required output power is greater than 75 W, the switching frequency is selected such that a required power factor correction (PFC) can be maintained; (2) when the required output power is lower than 75 W, the switching frequency is selected such that the peak current can be handled by the control switch and the magnetic (inductor). In some embodiments, a CrCM operation state is selected to obtain a high power factor, i.e., a constant on-time control signal with a variable switching frequency is employed when a high output power is required (e.g., greater than 75 W). That is, the switching frequency changes within a high-level portion of the half-cycle of the input signal when the output power is high (as illustrated by the CrCM state at the high-level portion of the AC input signal during the time period P1 in FIG. 9). When the output power is low, the switching frequency can be maintained at a constant, low switching frequency to reduce switching power losses. The constant, low switching frequency during the time period P2 in FIG. 9 causes an increase in the inductor current and can be selected such that the peak current can be handled by the control switch and the inductor.

Referring once again to FIG. 5, the lower the switching frequency, i.e., the longer the switching time period of the control pulse, the higher the peak current flowing through the inductor. In other words, there is a lower limit of the clamped switching frequency to control the magnitude of the peak current that can cause damage to the inductor and the switch. In one embodiment, the low, clamped switching frequency may be selected so that the converter can provide a peak current to charge an empty battery, but does not saturate the magnetic field present in the inductor and/or damage the switch. In one embodiment, the low limit of the switching frequency can be selected at least 10 times lower than the maximum switching frequency as shown in FIG. 3 or the clamped maximum switching frequency as shown in FIG. 4. In one embodiment, the low limit of the switching frequency can be selected at least 10 times lower than the entry frequency as shown in FIG. 9.

As an example, by selecting the switching frequency in the clamped frequency mode to be 10% of the threshold, i.e., a threshold of 3 MHz and a switching frequency in the clamped frequency mode of 300 kHz, the switching losses incurred are 10 times lower than conventional systems.

Figure 10:
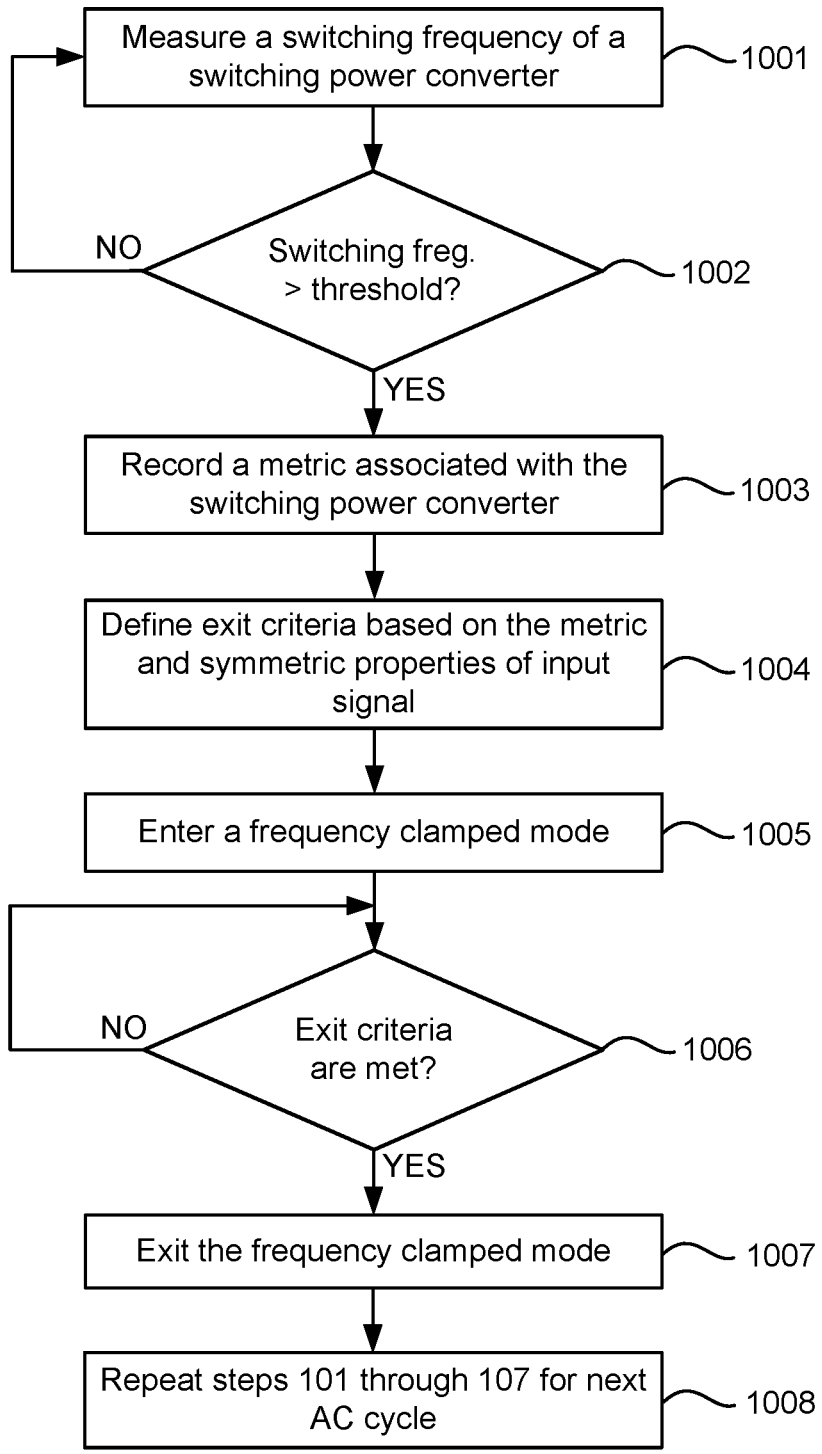
FIG. 10 is a simplified flowchart of a method for controlling a switching frequency clamping mode of a switching power converter that receives a periodically varying input signal according to an embodiment of the present disclosure.

FIG. 10 is a simplified flowchart of a method 1000 for controlling a switching frequency clamping mode of a switching power converter that receives a periodically varying input signal according to an embodiment of the present disclosure. Method 1000 includes measuring a switching frequency of the switching power converter at block 1001 and determining that the switching frequency reaches a threshold value at block 1002. When the switching frequency does not reach the threshold value (NO in 1002), method 1000 loops back to block 1001. When the switching frequency is determined to reach the threshold value (YES in 1002), method 1000 proceeds to block 1003, which includes recording a metric associated with the switching power converter. The metric may include a switching frequency threshold of the switching power converter, a voltage value of a voltage amplitude of the periodically varying input signal, which may be a scaled voltage amplitude, a phase angle value, or a time value of the periodically varying input signal. Method 1000 further includes defining exit criteria based on the metric and symmetric properties of the periodically varying input signal at block 1004 and entering a frequency clamped mode at block 1005. In one embodiment, the exit criteria may be determined or calculated from a parameter of the metric based on the phase angle symmetry of the input signal. In one embodiment, the exit criteria may be determined or calculated from a parameter of the metric based on the time symmetry of the input signal. In one embodiment, the exit criteria may be determined based on the voltage amplitude symmetry of the input signal. While operating in the frequency clamped mode, method 1000 also includes determining whether the exit criteria are met at block 1006. Method 1000 remains at block 1006 as long as the exit criteria are not met (NO at 1006), and proceeds to block 1007 when the exit criteria are met (YES at 1006). Method 100A also includes repeating blocks 1001 through 1007 for a next AC cycle of the periodically varying input signal (1008).

In one embodiment, the switching power converter operates in a critical conduction mode having a series of control signals with constant on-time and variable off-time intervals prior to entering the frequency clamped mode. In other words, the switching frequency varies with the amplitude of periodically varying input signal and has the lowest frequency value at the peak amplitude of the periodically varying input signal. When the switching power converter transitions to the frequency clamped mode, the switching frequency is clamped to a frequency value that is lower than the lowest frequency value in the critical conduction mode, as shown in FIGS. 8 and 9. In one embodiment, the exit criteria may include hysteresis to prevent the switching power converter from oscillating between the critical conduction mode and the frequency clamped mode when exiting the frequency clamped mode.

In other embodiments, other parameters in addition to the switching frequency and symmetry can be utilized to define entry/exit criteria, including phase angle, voltage, and/or a programmed on-time. As an example of phase angle, the phase angle from entry to the zero crossing is ~0.79 radians in the embodiment illustrated in FIG. 8. Accordingly, the exit criteria could be based on adding ~0.79 radians to the phase angle of 7 radians at the zero crossing. It should be noted that although symmetry with respect to the zero crossing is utilized in some embodiments, it is also possible to utilize symmetry with respect to the peak of the voltage, switching frequency, or the like.

Figure 11:
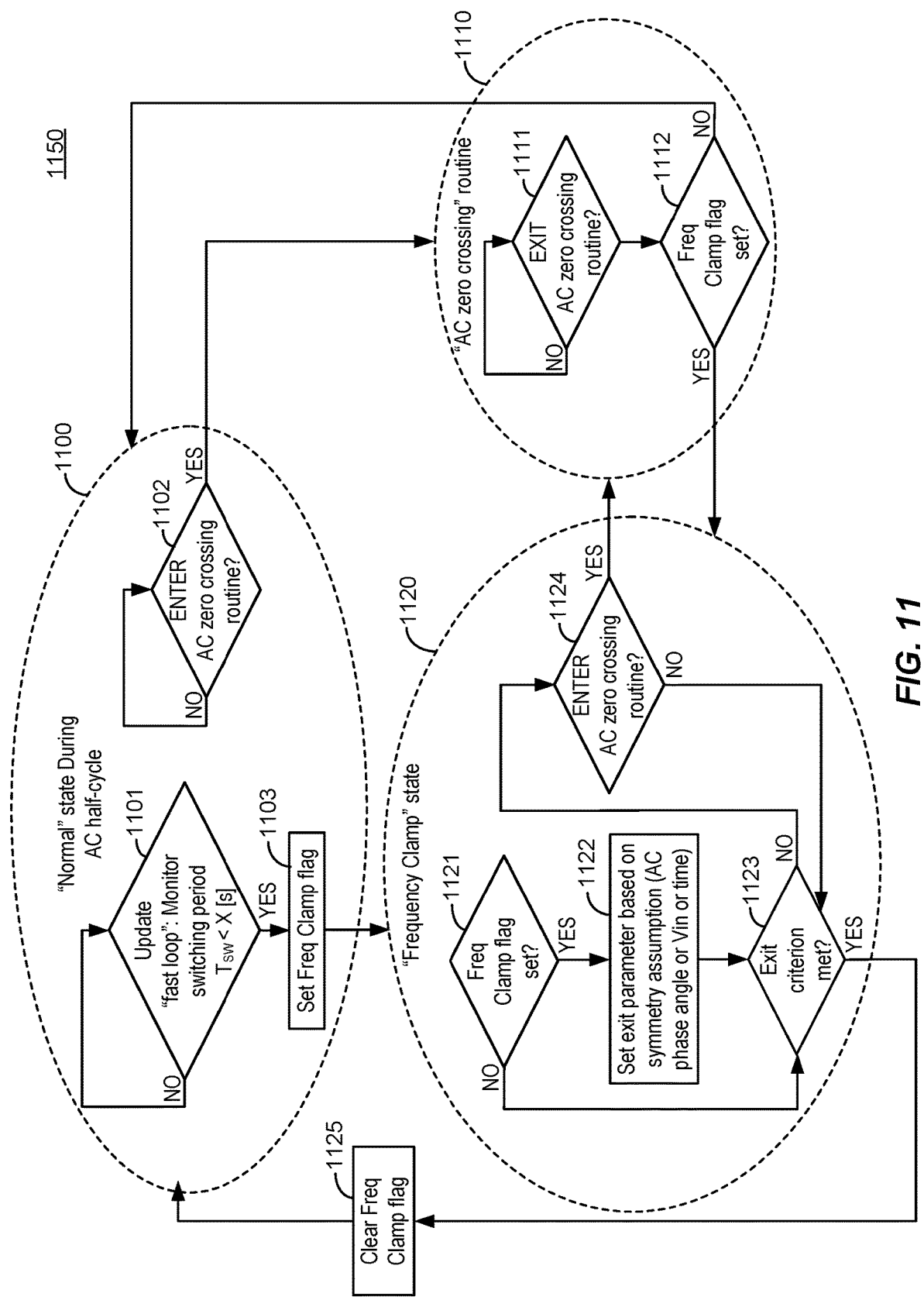
FIG. 11 is a simplified flowchart of a method for controlling a frequency clamping mode according to an embodiment of the present disclosure.

FIG. 11 is a simplified flowchart of a method 1150 for controlling a switching frequency clamping mode of a switching power converter according to an embodiment of the present disclosure. Method 1150 begins operation in a normal state 1100, also referred to as a normal operation mode, during an AC half-cycle, for example, the CrCM. Operation in normal state 1100 occurs, for example, when the power converter is plugged into a wall socket and turned on. Operation in normal state 1100 includes an operation 1101, which includes monitoring whether or not a time interval $T_{SW}$ is lower than a time threshold value X (i.e., the switching frequency is greater than a frequency threshold) and an operation 1102, which includes a routine for checking whether an AC zero-crossing has been entered. Operations 1101 and 1102 are running concurrently and independently in some embodiments. In other words, a controller is configured to determine both the operations 1101 and 1102. The switching power converter (alternatively referred to as the converter) operates in operation 1101 of the normal state 1100 where the AC input signal is not at a zero crossing.

Operation 1101 keeps operating in the CrCM and continually monitors the time interval $T_{SW}$ in relation to a time threshold value X. As will be evident to one of skill in the art, since the time interval $T_{SW}$ is the inverse of the switching frequency, the comparison of $T_{SW}$ to the time threshold value X is correlated to a comparison of the switching frequency to a frequency threshold. As long as the time interval $T_{SW}$ is not less than the threshold value X, i.e., the switching frequency is less than the predetermined frequency of the frequency threshold, operation 1101 continues looping in place. When the time interval $T_{SW}$ is determined to be less than the time threshold value X, i.e., the switching frequency is greater than a predetermined frequency of the frequency threshold, which could result from either a change that occurs in either the input signal or the output voltage, operation 1101 sets a frequency clamp flag (at operation 1103) and continues to operation 1120 of a frequency clamp state. In one embodiment, operation 1101 may include counting a number of occurrences where the time interval $T_{SW}$ is less than the threshold value X prior to setting the frequency clamp flag. The number of occurrences may be greater than or equal to one to cause the switching power converter to set the frequency clamp flag and transition to the frequency clamp state 1120.

In operation during normal state 1100, the converter, at some points, enters a zero crossing state, and operation 1102 determines whether the converter has entered an AC zero-crossing routine. The AC zero-crossing routine may include sampling an amplitude of the output voltage of the converter at the zero-crossing point of the scaled AC input signal and determining whether the sampled amplitude of the output voltage of the converter is within a predetermined range. When the sampled amplitude at the zero-crossing point is within the predetermined range, method 1150 determines that the AC zero-crossing routine has been entered and goes to operation 1110.

Operation 1110 includes operation 1111, which determines the exit of the AC zero-crossing routine. In one embodiment, when there is a change to the output voltage at the zero-crossing, the AC zero-crossing routine exits operation 1111 and proceeds to operation 1112, which determines whether the frequency clamp flag is set. When the frequency clamp flag is not set (NO in 1112), meaning that the switching frequency is less than the predetermined threshold frequency (i.e., time interval $T_{SW}$ is greater than the time threshold value X), method 1150 loops back to operation in the normal state 1100. When the frequency clamp flag is set (YES in 1112), which indicates that the switching frequency is greater than the predetermined threshold frequency or alternatively that the time interval $T_{SW}$ is less than the time threshold value X, method 1150 proceeds to the frequency clamp state 1120.

Frequency clamp state 1120 includes operation 1121, which determines whether the frequency clamp flag is set at operation 1121. When operation 1121 determines that the frequency clamp flag is set (YES in 1121), i.e., the switching frequency is greater than the predetermined frequency threshold, operation 1122 determines the amplitude of the scaled AC input signal, the phase angle, or the time point associated with this predetermined frequency threshold, which may be a desired maximum frequency, and sets an exit criteria based on a symmetry assumption of the input signal. In some embodiments, setting the exit criteria can be referred to as determining, calculating, or computing the exit criteria. The exit criteria may include or be defined based on a number of parameters, for example, the voltage amplitude of the scaled AC input signal, a phase angle in a phase-symmetrical relation with respect to the half-cycle as shown in FIG. 9, or the like. In an exemplary embodiment, the exit parameters can be set (i.e., determined, calculated, or computed) for the frequency clamp operating state, also referred to as a frequency clamp operating mode, based on a sensed parameter at the entry point, for example, the AC angle phase or the input voltage, and the symmetry assumption corresponding to the AC input signal. In one embodiment, instead of recording an entry phase (e.g., ~2.346 radians or an entry voltage ~3.5V as shown in FIG. 9), an entry time may be recorded when the AC frequency is known. Considering an example of the frequency of an AC power grid of 50 Hz, which results in a time period of 20 ms for an AC phase angle of 2π radians, an entry time corresponding to ~2.346 radians of ~2.346/3.142=~7.47 ms can be determined and recorded. The exit time can then be calculated based on the symmetric properties around π radians or 10 ms. In this case, the exit time is (10 ms-~7.47 ms)+10 ms=~12.53 ms as shown in FIG. 9.

After the exit parameters are set, operation 1123 determines whether the conditions for the exit criteria are met. When the exit criteria is met (YES in 1123), operation 1125 clears the frequency clamp flag, and method 1150 proceeds back to the normal state 1100. When the exit criteria is not met (NO in 1123), operation 1124 determines whether the AC zero-crossing routine is entered. When operation 1124 determines that the AC zero-crossing routine is not entered (NO in 1124), operation 1124 proceeds back to operation 1123 and repeats the operations until the exit criteria is met. When operation 1124 determines that the AC zero-crossing routine is entered (YES in 1124), method 1150 proceeds to the AC zero-crossing routine 1110. In operation 1110, when operation 1112 determines that the frequency clamp flag is set (YES in 1112), i.e., the switching frequency is greater than the maximum frequency threshold, method 1150 proceeds back to the frequency clamp state 1120.

It will be appreciated that other embodiments can also be implemented alternately to the fixed frequency DCM operation associated with low frequencies. For example, switching operation strategies may involve transitions into CrCM bursts (x cycles of switching and then y cycles of no switching), or DCM bursts or similar modes.

Figure 12:
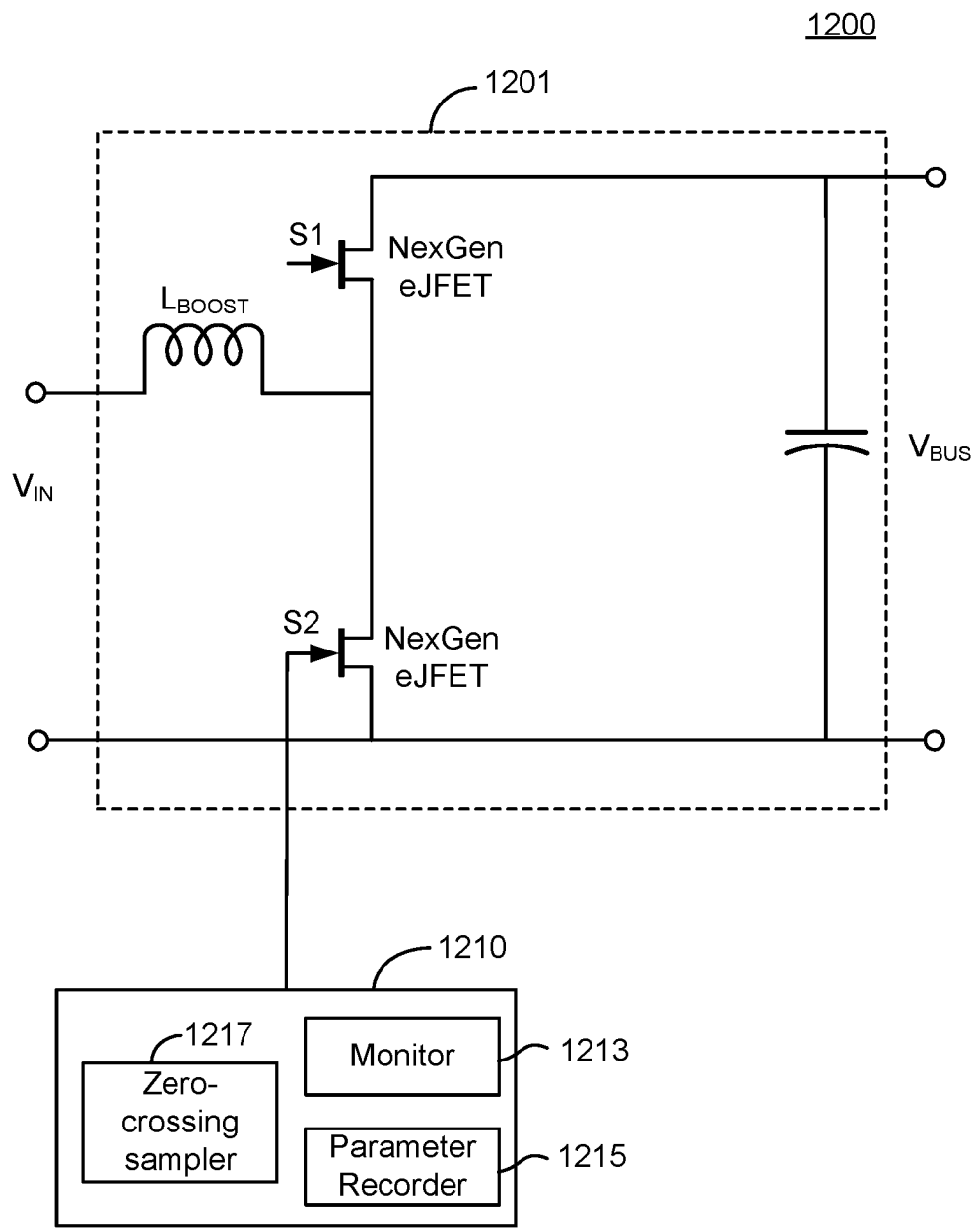
FIG. 12 is a simplified block circuit diagram illustrating a circuit including a controller for controlling a switch according to an embodiment of the present disclosure.

FIG. 12 is a simplified block circuit diagram illustrating an apparatus 1200 according to an embodiment of the present disclosure. Apparatus 1200 includes a switching power converter 1201 having a switch S2 for power factor correction and a controller 1210 configured to adjust the switching frequency of switch S2 depending on an output load condition. Referring to FIG. 12, switching power converter 1201 illustrates an operation state of the bridgeless totem-pole power factor converter in FIG. 1 when the input voltage polarity is positive with switch S3 turned off and switch S4 turned on for the entire positive AC half-cycle. In one embodiment, controller 1210 may include a monitor 1213, also referred to as a measuring device, configured to measure a switching time interval or a switching frequency and determine that the switching time interval or the switching frequency reaches a threshold value. Then, parameter recorder 1215 can be utilized to record a metric associated with the converter. The metric can be related to entry parameters used to define an entry criteria. Exit parameters of an exit criteria can then be determined based on the metric or the entry parameters. Controller 1210 may further include a zero-crossing sampler 1217 configured to sample an amplitude level of the output voltage in a vicinity of or at the zero-crossing point to determine an output load condition and/or a zero-crossing routine of the converter.

Referring once again to FIG. 11, during operation 1101, controller 1210 may monitor the switching time interval $T_{SW}$ to determine whether the switching time interval $T_{SW}$ is less than a time threshold value X. When the time interval $T_{SW}$ is less than the time threshold value X, i.e., the switching frequency is greater than a frequency threshold, controller 1210 causes the power converter to transition from a variable switching frequency state (e.g., the CrCM) to a constant switching frequency state (DCM), and parameter recorder 1215 records entry parameters to define an entry criteria of the power converter. In one embodiment, monitor 1213 may also be configured to count a number of occurrences that the switching time interval $T_{SW}$ is less than the time threshold value X before setting a frequency clamp flag (as indicated in operation 1103). In one embodiment, the frequency clamp flag is set when the number of occurrences is equal to one (unity). In another embodiment, the frequency clamp flag is set when the number of occurrences is greater than one. The entry criteria may be associated with a voltage level of the input signal, a phase angle of the input signal, or a time value with respect to a zero-crossing point of the input signal, as shown in FIG. 9.

Referring back to FIG. 9, controller 1210 may transition the power converter to a constant low switching frequency state illustrated by time period P2 when the output power at the load is reduced (e.g., lower than 75 W). The controller may automatically transition the power converter back to a variable switching frequency state illustrated by time period P1 when a high output power at the load is required. In one embodiment, the power converter operates in the CrCM until an entry criteria is detected; the power converter is then transitioned to operate in the DCM.

In embodiments of the present disclosure, when inside the frequency clamp mode of operation, the designer has the freedom to choose from "normal" appropriate operating modes or strategies. The example embodiment above shows a fixed or constant frequency DCM operation strategy, but at a much reduced switching frequency compared to the maximum frequency, which can be equal to the frequency threshold. In the example shown, a 10× reduction in switching frequency and, thus, in switching losses, can be achieved. In the embodiment, when the 3 MHz threshold is exceeded, the frequency clamp mode is entered, and 300 kHz fixed frequency DCM mode is assumed.

It would be appreciated to a person of skill in the art that alternatives are possible. For example, alternatively to a fixed frequency DCM corresponding to low frequency operation, appropriate operation strategies may involve CrCM bursts (x cycles of switching and then y time of no switching), DCM bursts or similar strategies.

Embodiments of the present disclosure provide several advantages and benefits over known solutions in that novel techniques of changing operation modes are provided rather than cycle-by-cycle switching frequency clamping.

Table 1 illustrates different operation conditions where the switching frequency is not clamped.

TABLE 1

Switching Frequency vs. operating conditions

| Input Voltage (RMS)\ Output Power | Low (Near 0%) | Medium (Near 50%) | High (Near 100%) |
|---|---|---|---|
| Low (Near brown-in/brown-out level) | Medium | Low | Lowest |
| Medium (Near middle of spec'd range) | High | Medium | Low |
| High (Near max of spec'd range) | *Highest* | *High* | Medium |

The first column of Table 1 shows, from top to bottom, the low, medium, and the high RMS input voltage. The rows show, from left to right, the corresponding switching frequency as a function of low, medium, and high output power. As can be seen from Table 1, the switching frequency is high, indicated in bold-italics-underline, when the output power is low or medium. In other words, power losses increase per cycle exactly at the highest operating frequency, which is characterized by the greatest number of cycles per unit time, during operating conditions in which performance targets normally prioritize lowering power losses due to the ratio between switching related losses and conduction losses.

Table 2 illustrates the relative or qualitative loss ratio between switching related losses and conduction losses in traditional switching frequency clamping techniques.

TABLE 2

Switching/Conduction losses vs. operating conditions

| Input Voltage (RMS)\ Output Power | Low (Near 0%) | Medium (Near 50%) | High (Near 100%) |
|---|---|---|---|
| Low (Near brown-in/brown-out level) | Medium/Low | Low/High | Lowest/Highest |
| Medium (Near middle of spec'd range) | *Extreme*/Low | Medium/Medium | Low/High |
| High (Near max of spec'd range) | *Extreme*/Lowest | *Extreme*/Low | Medium/Medium |

The first column shows, from top to bottom, the low, medium, and the high RMS input voltage. The rows show, from left to right, the loss ratio between switching loss and conduction loss as a function of operating conditions. As can be seen in Table 2, the switching related loss is extreme, indicated in bold-italics-underline, when the output power is low or medium.

Embodiments of the present disclosure establish entry and exit criteria for a novel operating mode, which enables utilization of a different operational principle of the converter in contrast with cycle-by-cycle operation. In accordance with the present disclosure, a controller concurrently monitors a switching frequency and an AC zero-crossing routine to determine an entry criteria and then define an exit criteria based on the entry criteria and the symmetric properties of an input signal to enable a power converter to exit an operating mode within a single cycle when appropriate. In contrast, conventional techniques are not able to transition from an operation mode to a different operation mode within a single cycle because the exit criteria cannot be determined within a single cycle.

As described herein, some embodiments of the present invention establish exit criteria using an assumption of symmetry. As an example, the symmetry could be based on the frequency being substantially dominated by the input voltage during the time the operating mode is active. As another example, the symmetry could be based on the input voltage being substantially sinusoidal or a rectified sinusoidal waveform for the half-periods near the time when the operating mode is active, for example, half-periods prior to or during the time when the operating mode is active.

According to embodiments of the present disclosure, the exit criteria, by assumption of symmetry, may be one of (or a combination of) the following parameters:

a. Voltage (e.g., AC input voltage "mains supply voltage");

b. AC phase angle measured in radians or degrees;

c. Time (e.g., the time elapsed between a symmetry point and entry is used to set the time to elapse between a symmetry point and exit).

The exit criteria may be set utilizing an assumption of symmetry with or without hysteresis applied to any of the criteria (a), (b) or (c). The hysteresis is configured to prevent the power converter from oscillating between the constant switching frequency state and the variable switching frequency state.

According to embodiments of the present disclosure, a designer is provided with the ability to select among several design options to reduce or minimize losses depending on the load conditions. For example, under light load conditions when the input voltage is low, for example, when the load is less than 50% of the normal load, the designer may select medium switching losses and low conduction losses. Under medium load conditions, when the load is about 50% of the normal load, the designer may select low switching losses and high conduction losses. Under high load condition, when the load is near 100% of the normal load, the designer may select very low switching losses and very high conduction losses. Conversely, under light load conditions when the input voltage is high (e.g., it reaches the maximum specified range), the designer may select medium switching losses and low conduction losses. Under medium and high load conditions, the designer may select medium switching losses and medium conduction losses.

Table 3 illustrates a relative or qualitative loss ratio optimization between switching related losses and conduction losses according to embodiments of the present disclosure.

TABLE 3

Switching/Conduction losses vs. operating conditions

| Input Voltage (RMS)\ Output Power | Low (Near 0%) | Medium (Near 50%) | High (Near 100%) |
|---|---|---|---|
| Low (Near brown-in/ brown-out lvl) | Medium/Low | Low/High | Lowest/ Highest |
| Medium (Near middle of spec'd range) | Medium/ Medium | Medium/ Medium | Low/High |
| High (Near max of spec'd range) | Medium/Low | Medium/ Medium | Medium/ Medium |

When a different frequency clamp mode is entered, the designer has the opportunity to optimize the ratio between the switching losses and the conduction losses in order to lower the overall losses. As discussed in relation to Tables 1 and 2, embodiments of the present disclosure provide medium switching losses and medium conduction losses when the input voltage is medium (e.g., in the middle of the specified range) and the output power is low in comparison with conventional techniques that utilize no clamping switching frequency and have high switching losses and conduction losses.

Alternative embodiments of the present disclosure may include establishing the exit criteria by performing a "ghost-frequency" conversion mimicking what the "natural" switching frequency would have been if it were not clamped, and exiting when the "ghost-frequency" drops below the maximum frequency threshold (with or without hysteresis) again.

Other embodiments may include a form of "test-exiting," where the frequency clamp state exits at quasi-random times (by using an interval timer or other method), and simply enters again when the switching frequency cycle is too short.

The embodiments above have been described in relation to determining an entry criteria and defining an exit criteria based on the entry criteria and symmetric properties of an input signal. The entry criteria may be a voltage level, a phase angle (in radians or degrees), or time. The embodiments allow a designer to optimize the ratio between the switching losses and the conduction losses in order to lower the overall losses.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating a switching power converter having an input operable to receive a periodic input signal and an output operable to provide a substantially constant output voltage, the method comprising:
   measuring a switching time interval or a switching frequency of the switching power converter;
   comparing the switching time interval or the switching frequency with a predetermined threshold value to obtain a comparison result;
   recording an entry criteria in response to the comparison result, wherein the entry criteria indicates a transition of the switching power converter from a variable switching frequency state to a constant switching frequency state; and
   defining an exit criteria based on the entry criteria and symmetric properties of the periodic input signal.

2. The method of claim 1 wherein the entry criteria is associated with a time value, a voltage level, or a phase angle of periodic input signal.

3. The method of claim 1 wherein defining the exit criteria comprises:
   obtaining an amplitude level of the periodic input signal at which an entry transition occurs; and
   determining the exit criteria based on the obtained amplitude level.

4. The method of claim 3 wherein the exit criteria comprises hysteresis to prevent the switching power converter from oscillating between the constant switching frequency state and the variable switching frequency state.

5. The method of claim 3 wherein obtaining the amplitude level of the periodic input signal comprises determining a change direction of the periodic input signal.

6. The method of claim 1 wherein the exit criteria is determined based on mirroring of the entry criteria with respect to a zero-crossing point of the periodic input signal or with respect to a peak voltage of the periodic input signal.

7. The method of claim 1 further comprising:
   sampling an amplitude of the output voltage at a zero-crossing point of the periodic input signal; and
   determining a load condition of the switching power converter; and
   changing the constant switching frequency state to the variable switching frequency state in response to the determined load condition.

8. The method of claim 1 wherein the constant switching frequency state comprises a constant switching frequency that is lower than a variable switching frequency of the variable, switching frequency state.

9. The method of claim 1 wherein the constant switching frequency state is a discontinuous conduction mode and the variable switching frequency state is a critical conduction mode.

10. The method of claim 1 wherein the switching time interval or the switching frequency of the switching power converter is measured using a monitor device.

11. A controller for controlling a switching power converter having an input for receiving a periodic input signal and an output for providing a substantially constant output voltage to a load, the controller comprising:
- a monitor device configured to compare a switching time interval or a switching frequency with a predetermined threshold value to obtain a comparison result; and
- a parameter recorder configured to record an entry criteria in response to the comparison result, wherein the entry criteria indicates a transition of the switching power converter from a variable switching frequency state to a constant switching frequency state, and wherein the parameter recorder is further configured to define an exit criteria based on the entry criteria and symmetric properties of the periodic input signal.

12. The controller of claim 11 wherein the entry criteria is associated with a time value, a voltage level, or a phase angle of the periodic input signal.

13. The controller of claim 11 wherein the entry criteria comprises an amplitude level of the periodic input signal, and the exit criteria comprises the amplitude level of the periodic input signal.

14. The controller of claim 11 wherein the exit criteria comprises hysteresis to prevent the switching power converter from oscillating between the constant switching frequency state and the variable switching frequency state.

15. The controller of claim 11 wherein the exit criteria is determined based on time-value mirroring of the entry criteria with respect to a zero-crossing point of the periodic input signal or with respect to a peak voltage point of the periodic input signal.

16. The controller of claim 11 wherein the entry criteria is predetermined based on a voltage level of the periodic input signal.

17. The controller of claim 11 further comprising a zero-crossing detector configured to sample an amplitude of the output voltage of the switching power converter at a zero-crossing point of the periodic input signal to determine a load condition of the load, wherein the controller causes the switching power converter to transition from the constant switching frequency state to the variable switching frequency state in response to the load condition.

* * * * *